(12) United States Patent
Nishida et al.

(10) Patent No.: US 10,982,949 B2
(45) Date of Patent: Apr. 20, 2021

(54) MEASUREMENT APPARATUS, MEASUREMENT METHOD, AND COMPUTER READABLE MEDIUM

(71) Applicant: YOKOGAWA ELECTRIC CORPORATION, Tokyo (JP)

(72) Inventors: Kazufumi Nishida, Tokyo (JP); Hitoshi Hara, Tokyo (JP); Kazuki Setsuda, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/697,180

(22) Filed: Nov. 27, 2019

(65) Prior Publication Data

US 2020/0173767 A1 Jun. 4, 2020

(30) Foreign Application Priority Data

Nov. 29, 2018 (JP) .............................. JP2018-223533

(51) Int. Cl.
*G01B 11/06* (2006.01)
*G01N 21/27* (2006.01)
*G01N 21/64* (2006.01)

(52) U.S. Cl.
CPC ........ *G01B 11/0633* (2013.01); *G01N 21/274* (2013.01); *G01N 2021/6421* (2013.01)

(58) Field of Classification Search
CPC .......... G02B 5/20; G02B 5/30; G02B 6/0018; G02B 6/0028; G02B 6/006; G02B 6/0088;

(Continued)

(56) References Cited

U.S. PATENT DOCUMENTS 4,748,329 A * 5/1988 Cielo ................. G01B 11/0691
250/559.28
2005/0237539 A1* 10/2005 Germanenko ..... G01B 11/0616
356/504

(Continued)

FOREIGN PATENT DOCUMENTS

CN 102654454 A 9/2012
CN 104246477 A 12/2014

(Continued)

OTHER PUBLICATIONS

Extended European Search Report for European Patent Application No. 19211492.4, issued by the European Patent Office dated Apr. 6, 2020.

(Continued)

*Primary Examiner* — Michael P Stafira

(57) ABSTRACT

A measurement apparatus includes a detection unit to detect a first light intensity of a light obtained by making a first light having a first wavelength transmitted through a measurement object, a second light intensity of a light obtained by making a second light having a second wavelength transmitted through the object, the second wavelength having a lower rate of absorption by a material of the object than the first wavelength, and a third light intensity of a light obtained by making a third light having a third wavelength transmitted through the object, the third wavelength having a lower rate of absorption by the material of the object than the first wavelength and having a lower rate of absorption by the object containing a fluid than the second wavelength, and a calculation unit to calculate the thickness of the object by using the first, second, and third light intensities.

12 Claims, 8 Drawing Sheets

(58) Field of Classification Search
CPC .......... G02B 5/23; G02B 5/26; G02B 5/3016; G02B 6/0068; G02B 6/0075; G02B 5/201; G02B 6/003; G02B 6/0036; G02B 6/005; G02B 6/0065; G02B 6/0076; G02B 27/0101; G02B 27/283; G02B 5/003; G02B 5/0231; G02B 5/0242; G02B 5/0294; G02B 5/08; G02B 5/22; G02B 5/223; G02B 5/28; G02B 5/3025; G02B 5/3033; G02B 5/305; G02B 5/3083; G02B 6/0011; G02B 6/0015; G02B 6/0016; G02B 6/0031; G02B 6/0043; G02B 6/0073; G02B 6/0078; G02B 6/0081; G02B 6/0085; G02B 6/009; G02B 6/0095; G02B 6/4239; G02B 1/04; G02B 1/041; G02B 1/11; G02B 1/111; G02B 1/14; G02B 2027/0114; G02B 2027/012; G02B 2027/0178; G02B 2027/0187; G02B 2027/0194; G02B 21/08; G02B 21/082; G02B 21/16; G02B 26/005; G02B 26/02; G02B 27/01; G02B 27/017; G02B 27/0172; G02B 27/0977; G02B 27/126; G02B 27/141; G02B 27/288; G02B 27/30; G02B 27/48; G02B 5/02; G02B 5/0278; G02B 5/045; G02B 5/12; G02B 5/124; G02B 5/208; G02B 5/282; G02B 5/3041; G02B 6/002; G02B 6/0051; G02B 6/0055; G02B 6/0056; G02B 6/0058; G02B 6/0083; G02B 6/02347; G02B 6/1225; G02B 6/42; G02B 1/02; G02B 1/116; G02B 1/118; G02B 1/18; G02B 27/0006; G02B 27/281; G02B 5/0221; G02B 5/0263; G02B 5/0284; G02B 5/1814; G02B 5/281; G02B 5/285; G01N 2021/8967; G01N 21/31; G01N 21/896; G01N 21/274; G01N 17/004; G01N 2021/1704; G01N 2021/4766; G01N 2021/6421; G01N 2021/7726; G01N 2021/8416; G01N 2021/8438; G01N 2021/8466; G01N 21/1702; G01N 21/33; G01N 21/3554; G01N 21/3563; G01N 21/359; G01N 21/4738; G01N 21/64; G01N 21/76; G01N 21/7703; G01N 21/8422; G01N 21/86; G01N 21/8914; G01N 27/125; G01N 27/127; G01N 33/0011; G01N 33/5438; G01N 2035/00881; G01N 2035/0425; G01N 2035/0436; G01N 35/026; G01N 33/32; G01N 17/00; G01N 17/04; G01N 21/3581; G01N 21/47; G01N 21/59; G01N 21/84; G01N 2201/0221; G01N 2201/06113; G01N 2201/0627; G01N 22/02; G01N 22/04; G01N 25/72; G01N 15/082; G01N 15/088; G01N 15/1468; G01N 15/1475; G01N 1/2813; G01N 2015/0065; G01N 2015/0846; G01N 2015/086; G01N 2015/1006; G01N 2021/4735; G01N 2021/8427; G01N 2033/0096; G01N 2033/245; G01N 21/3559; G01N 21/55; G01N 2201/061; G01N 2201/0697; G01N 2201/12; G01N 9/24; G01B 11/0633; G01B 11/0691; G01B 11/0625; G01B 11/06; G01B 11/0616; G01B 11/0683; G01B 11/00; G01B 11/105; G01B 11/24; G01B 11/2441; G01B 11/27; G01B 15/02; G01B 21/08

See application file for complete search history.

(56) References Cited

U.S. PATENT DOCUMENTS

| | | | |
|---|---|---|---|
| 2006/0132796 A1* | 6/2006 | Haran | G01N 33/346 356/503 |
| 2006/0139655 A1* | 6/2006 | Tixier | G01B 11/0641 356/504 |
| 2012/0218542 A1* | 8/2012 | Ichizawa | G01N 21/86 356/51 |
| 2015/0090885 A1 | 4/2015 | Ichizawa | |
| 2019/0011353 A1* | 1/2019 | Setsuda | G01J 3/108 |

FOREIGN PATENT DOCUMENTS

| | | |
|---|---|---|
| JP | H04212003 A | 8/1992 |
| JP | 6394825 B1 | 9/2018 |

OTHER PUBLICATIONS

Notice of First Office Action for Patent Application No. 201911059835.3, issued by the National Intellectual Property Administration of the People's Republic of China dated Feb. 20, 2021.

* cited by examiner

MEASUREMENT APPARATUS, MEASUREMENT METHOD, AND COMPUTER READABLE MEDIUM

The contents of the following Japanese patent application(s) are incorporated herein by reference:
2018-223533 filed in JP on Nov. 29, 2018

BACKGROUND

1. Technical Field

The present invention relates to a measurement apparatus, a measurement method, and a recording medium having recorded thereon a measurement program.

2. Related Art

Up to now, an infrared thickness gauge using transmission and absorption of infrared rays has been proposed. (For example, see PTL 1). In accordance with the infrared thickness gauge according to PTL 1, a thickness of a film can be measured by using an M light (measurement light) at a wavelength in an absorption band for the film and less absorbing wavelength bands (reference lights) R1 and R2 that sandwich the M light, and performing compensation computation with respect to the M light based on R1 and R2.

PTL 1 Japanese Unexamined Patent Application Publication No. 4-212003

However, in a case where a thickness of a measurement object having a characteristic of absorbing a fluid, for example, having a water-absorbing property is measured by a related-art thickness gauge, transmittances of a measurement light and reference lights may change depending on an absorbed amount of the fluid by the measurement object, and a measurement error may be increased.

GENERAL DISCLOSURE

To address the above-mentioned problem, according to a first aspect of the present invention, a measurement apparatus that measures a thickness of a sheet-like measurement object is provided. The measurement apparatus may include a detection unit configured to detect a first light intensity of a light obtained by causing a first light having a first wavelength to be transmitted through the measurement object, a second light intensity of a light obtained by causing a second light having a second wavelength to be transmitted through the measurement object, the second wavelength having a lower rate of absorption by a material of the measurement object than the first wavelength, and a third light intensity of a light obtained by causing a third light having a third wavelength to be transmitted through the measurement object, the third wavelength having a lower rate of absorption by the material of the measurement object than the first wavelength and having a lower rate of absorption by the measurement object containing a fluid than the second wavelength. The measurement apparatus may include a thickness calculation unit configured to calculate the thickness of the measurement object by using the first light intensity, the second light intensity, and the third light intensity.

The fluid may be moisture.

The measurement apparatus may further include a correction value calculation unit configured to calculate a correction value set to reduce an influence of light absorption by the fluid contained in the measurement object based on the first light intensity, the second light intensity, and the third light intensity detected by the detection unit, and the thickness calculation unit may calculate the thickness of the measurement object by using the correction value calculated by the correction value calculation unit.

The correction value calculation unit may calculate a correction coefficient based on the first light intensity, the second light intensity, and the third light intensity in a plurality of cases where an amount of the fluid contained in the measurement object varies, and calculate the correction value by using the calculated correction coefficient.

The correction value calculation unit may calculate the correction coefficient by using an expression in (Math. 3) and assign the calculated correction coefficient to an expression in (Math. 2) to calculate the correction value.

$$\frac{T_{11}}{\alpha_1 T_{21} + \alpha_2 T_{31}} = \frac{T_{12}}{\alpha_1 T_{22} + \alpha_2 T_{32}} \quad \text{[Math. 3]}$$

(where, in the expression in (Math. 3), a primary first transmittance of the first light, a primary second transmittance of the second light, and a primary third transmittance of the third light before the amount of the fluid contained in the measurement object is changed are respectively $T_{11}$, $T_{21}$, and $T_{31}$, a secondary first transmittance of the first light, a secondary second transmittance of the second light, and a secondary third transmittance of the third light after the amount of the fluid contained in the measurement object is changed are respectively $T_{12}$, $T_{22}$, and $T_{32}$, and $\alpha_1 + \alpha_2 = 1$ is established.), and $$T_c = \frac{T_1}{\alpha_1 T_2 + \alpha_2 T_3} \quad \text{[Math. 2]}$$

(where, in the expression in (Math. 2), a first transmittance of the first light, a second transmittance of the second light, and a third transmittance of the third light are respectively $T_1$, $T_2$, and $T_3$, and $T_c$ is the correction value.).

The measurement apparatus may further include a storage unit that previously stores a correction coefficient, and the correction value calculation unit may calculate the correction value by using the correction coefficient obtained from the storage unit.

The correction value calculation unit may calculate a first transmittance of a light obtained by causing the first light to be transmitted through the measurement object based on the first light intensity, calculate a second transmittance of a light obtained by causing the second light to be transmitted through the measurement object based on the second light intensity, calculate a third transmittance of a light obtained by causing the third light to be transmitted through the measurement object based on the third light intensity, and calculate the correction value by using the first transmittance, the second transmittance, and the third transmittance that have been calculated.

The detection unit may detect a fourth light intensity of a light obtained by causing a fourth light having a fourth wavelength to be transmitted through the measurement object, the fourth wavelength having a lower rate of absorption by the material of the measurement object than the first wavelength and having a lower rate of absorption by the measurement object containing the fluid than the second wavelength, and also the fourth wavelength being different from the third wavelength, and the correction value calculation unit may calculate the correction value set to reduce the influence of the light absorption by the fluid contained in the measurement object and an influence of wavelength dependence of light scattering by the material of the measurement object based on the first light intensity, the second light intensity, the third light intensity, and the fourth light intensity detected by the detection unit.

An absorbance by the fluid at the second wavelength may be two or more times as high as an absorbance by the fluid at the third wavelength.

The measurement apparatus may further include a light output unit configured to output the first light, the second light, and the third light.

The measurement apparatus may further include a first integrating sphere that is disposed at a position having a gap with respect to a first surface of the measurement object and includes a first opening that faces the first surface and a second integrating sphere that is disposed at a position having a gap with respect to a second surface of the measurement object on a side opposite to the first surface and includes a second opening that faces the first opening across the measurement object, and the light output unit may irradiate an inside of the first integrating sphere with the lights, and the detection unit may detect intensities of lights inside the second integrating sphere.

According to a second aspect of the present invention, a measurement method of measuring a thickness of a sheet-like measurement object is provided. The measurement method may include detecting a first light intensity of a light obtained by causing a first light having a first wavelength to be transmitted through the measurement object, a second light intensity of a light obtained by causing a second light having a second wavelength to be transmitted through the measurement object, the second wavelength having a lower rate of absorption by a material of the measurement object than the first wavelength, and a third light intensity of a light obtained by causing a third light having a third wavelength to be transmitted through the measurement object, the third wavelength having a lower rate of absorption by the material of the measurement object than the first wavelength and having a lower rate of absorption by the measurement object containing a fluid than the second wavelength. The measurement method may include calculating the thickness of the measurement object by using the first light intensity, the second light intensity, and the third light intensity that have been detected.

According to a third aspect of the present invention, a recording medium having recorded thereon a measurement program is provided. The measurement program may be executed by a computer. The measurement program may cause the computer to function as a detection unit configured to detect a first light intensity of a light obtained by causing a first light having a first wavelength to be transmitted through a measurement object, a second light intensity of a light obtained by causing a second light having a second wavelength to be transmitted through the measurement object, the second wavelength having a lower rate of absorption by a material of the measurement object than the first wavelength, and a third light intensity of a light obtained by causing a third light having a third wavelength to be transmitted through the measurement object, the third wavelength having a lower rate of absorption by the material of the measurement object than the first wavelength and having a lower rate of absorption by the measurement object containing a fluid than the second wavelength. The measurement program may cause the computer to function as a thickness calculation unit configured to calculate the thickness of the measurement object by using the first light intensity, the second light intensity, and the third light intensity detected by the detection unit.

It is noted that not all the features necessary for the present invention are enumerated in the above-mentioned summary of the invention. In addition, sub-combinations of these feature groups may also constitute the invention.

DESCRIPTION OF EXEMPLARY EMBODIMENTS

Hereinafter, the present invention will be described by way of embodiments of the invention, but the following embodiments are not intended to restrict the invention in the scope of claims. In addition, not all combinations of features described in the embodiments necessarily have to be essential to solving means of the invention.

Figure 1:
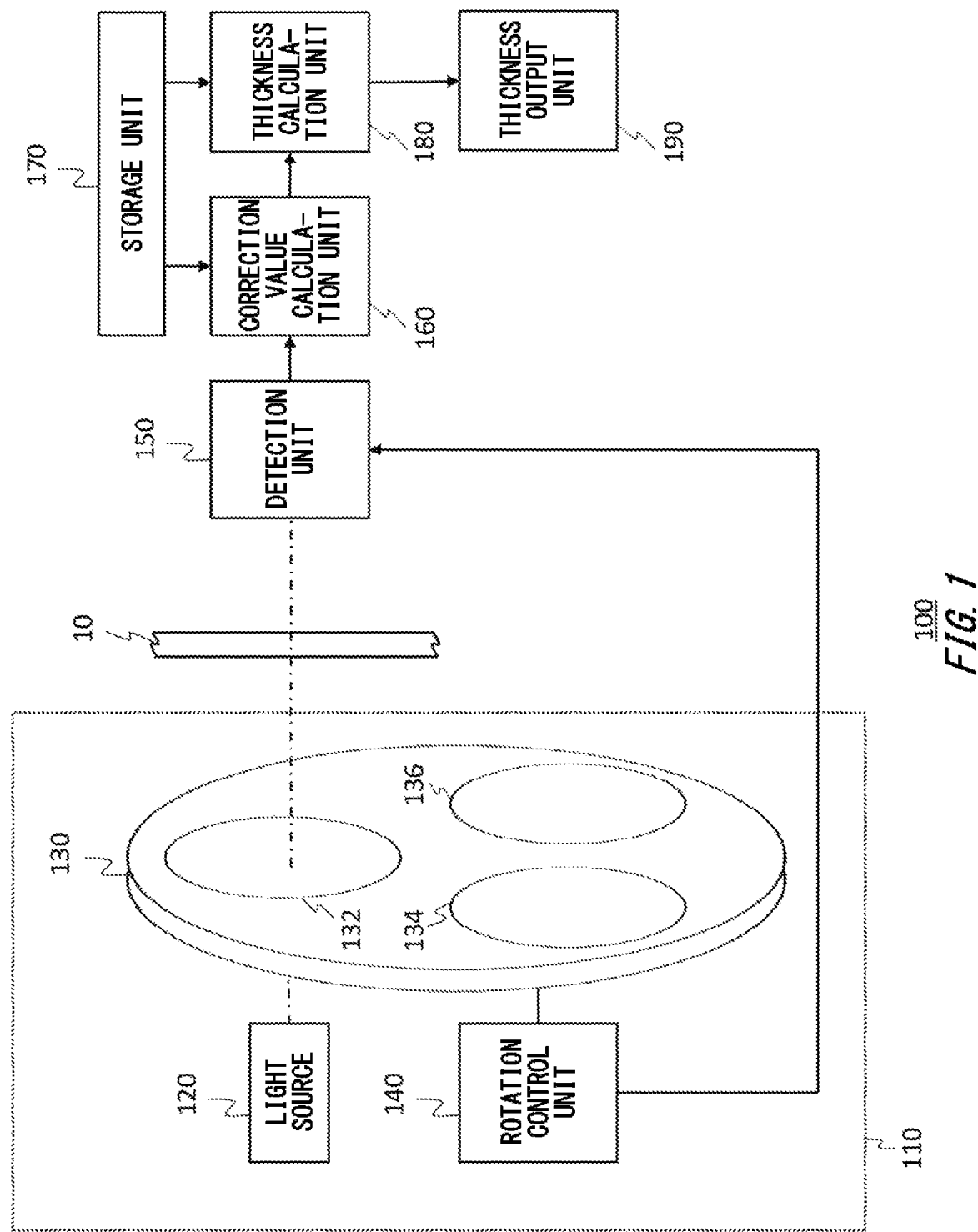
FIG. 1 illustrates a measurement apparatus 100 according to a present embodiment together with a measurement object 10.

FIG. 1 illustrates a measurement apparatus 100 according to the present embodiment together with a measurement object 10. The measurement apparatus 100 calculates a thickness of the measurement object 10 by using respective light intensities detected in a case where a measurement light and a plurality of reference lights are caused to be transmitted through the measurement object 10. At this time, the measurement apparatus 100 according to the present embodiment can correct an influence of a fluid contained in the measurement object 10 and obtain stable thickness output by proactively using a wavelength having a high absorbance by the fluid contained in the measurement object 10 as one of the reference lights. Herein, the fluid may be moisture, for example. A case where the fluid is moisture will be described below as an example. In addition, a case where the measurement apparatus 100 measures the thickness of the measurement object 10 as a physical quantity will be described below as an example. However, the configuration is not limited to this. The measurement apparatus 100 may also measure other physical quantities such as, for example, a grammage, a density, and a moisture percentage of the measurement object 10.

The measurement object 10 may have a sheet-like shape and have a thickness between approximately several μm and approximately several mm, for example. In addition, the measurement object 10 may have a predetermined width and have a shape continuous in a longitudinal direction. According to the present embodiment, the measurement object 10 may further have a water-absorbing property. It is noted that the "water-absorbing property" mentioned herein means a property for absorbing moisture and is used as a concept also including a property for absorbing moisture in the form of a gas (hygroscopic property) such as moisture in the air (for example, water vapor), in addition to a property for absorbing moisture in the form of a liquid. According to the present embodiment, the measurement object 10 may include a resin material having a high water absorption such as, for example, nylon, cellulosic resin, and urethane resin.

The measurement apparatus 100 according to the present embodiment measures the thickness of the sheet-like measurement object 10. The measurement apparatus 100 includes a light output unit 110, a detection unit 150, a correction value calculation unit 160, a storage unit 170, a thickness calculation unit 180, and a thickness output unit 190.

The light output unit 110 irradiates the measurement object 10 with a plurality of lights at different wavelengths. In one example, the light output unit 110 outputs a first light having a first wavelength $\lambda_1$, a second light having a second wavelength $\lambda_2$, and a third light having a third wavelength $\lambda_3$. The wavelengths of the lights output by the light output unit 110 will be described below. In this drawing, the light output unit 110 includes a light source 120, a filter unit 130, and a rotation control unit 140.

The light source 120 emits lights in a wavelength band including a plurality of wavelengths used for measuring the measurement object 10. The light source 120 may be a light source such as a halogen lamp or a light emitting diode (LED) having a light emission band in an infrared band, for example.

The filter unit 130 includes a plurality of filters respectively corresponding to the plurality of wavelengths used for measuring the measurement object 10. The plurality of filters may be optical bandpass filters that allow passage of predetermined wavelengths, for example. The filter unit 130 is formed to have a disc-like shape and includes a plurality of through-holes where the plurality of filters are disposed. The filter unit 130 includes, for example, a first filter 132 having a passband at the first wavelength, a second filter 134 having a passband at the second wavelength, and a third filter 136 having a passband at the third wavelength.

The rotation control unit 140 rotates the filter unit 130 to control an arrangement of the plurality of filters. The rotation control unit 140 rotates the filter unit 130 in a manner that the filter corresponding to the wavelength of the light that should be emitted by the light output unit 110 among the plurality of filters faces the light source 120. For example, in a case where the light output unit 110 emits the light at the first wavelength, the rotation control unit 140 causes the first filter 132 to face the light source 120 and selectively causes the light at the first wavelength in a spectrum of the light emitted by the light source 120 to be output to the outside of the light output unit 110.

In this manner, since only the wavelength that should be emitted can be selectively emitted from the light emission band of the light source 120 by the filter unit 130, it is possible to inexpensively construct the light output unit 110 that emits the plurality of lights at the different wavelengths. It is noted that the case has been illustrated as an example where the light output unit 110 emits the lights at the three wavelengths in the above description, but the configuration is not limited to this. The light output unit 110 may also be constructed to dispose four or more filters in the filter unit 130 and emit lights at four or more wavelengths, for example.

In the above description, the case has been illustrated as an example where the wavelength that should be emitted is output by the light output unit 110 selectively from the light emission band of the light source 120 by the filter unit 130. However, the configuration of the light output unit 110 is not limited to this. The light output unit 110 may use, for example, a variable wavelength light source in which a wavelength to be emitted is variable as the light source 120. In this case, the light output unit 110 may also include a control unit configured to directly control the wavelength of the light emitted by the light source 120 instead of the filter unit 130 and the rotation control unit 140. In addition, the case has been illustrated as an example where the light output unit 110 uses the lamp, the LED, or the like as the light source 120 in the above description, but the configuration is not limited to this. The light output unit 110 may also include one or a plurality of lasers or the like configured to output a light at a predetermined wavelength as the light source 120. For example, in a case where the light output unit 110 includes a plurality of light sources such as lasers that output lights at different wavelengths as the light sources 120, the light output unit 110 may modulate the lights from the plurality of light sources 120 by different modulation frequencies. Then, the light output unit 110 may also generate a combined light by combining lights at different wavelengths which have been modulated by the different modulation frequencies from each other by using a half mirror or the like and output the combined light in which the lights at the plurality of different wavelengths are combined with each other.

The detection unit 150 detects intensities of respective lights in a case where a plurality of lights at different wavelengths are caused to be transmitted through the measurement object 10. The detection unit 150 may be a sensor such as, for example, a photodiode configured to detect electromagnetic energy such as a light. According to the present embodiment, the detection unit 150 detects a first light intensity $I_1$ of a light obtained by causing the first light having the first wavelength $\lambda_1$ to be transmitted through the measurement object 10, a second light intensity $I_2$ of a light obtained by causing the second light having the second wavelength $\lambda_2$ to be transmitted through the measurement object 10, the second wavelength $\lambda_2$ having a lower rate of absorption by a material of the measurement object 10 than the first wavelength $\lambda_1$, and a third light intensity $I_3$ of a light obtained by causing the third light having the third wavelength $\lambda_3$ to be transmitted through the measurement object 10, the third wavelength $\lambda_3$ having a lower rate of absorption by the material of the measurement object than the first wavelength $\lambda_1$ and having a lower rate of absorption by the measurement object containing the fluid than the second wavelength $\lambda_2$. A relationship among $\lambda_1$, $\lambda_2$, and $\lambda_3$ will be described below.

In addition, the detection unit 150 detects respective light intensities in a case where the first light, the second light, and the third light are emitted from the light output unit 110 at the same intensities as the intensity of light used in measurement of the measurement object 10 is measured in a state in which the measurement object 10 is not set in a measurement position, that is, a state in which the measurement object 10 does not intervene between the light output unit 110 and the detection unit 150, as a first incident light intensity $I_{10}$, a second incident light intensity $I_{20}$, and a third incident light intensity $I_{30}$. Then, the detection unit 150 supplies the first light intensity $I_1$, the second light intensity $I_2$, and the third light intensity $I_3$ and also the first incident light intensity $I_{10}$, the second incident light intensity $I_{20}$, and the third incident light intensity $I_{30}$ which have all been detected to the correction value calculation unit 160.

It is noted that, for example, in a case where the plurality of lights at the different wavelengths are respectively output at different timings from the light output unit 110, the detection unit 150 may obtain information on the timings from the light output unit 110 and respectively detect the lights at the different wavelengths at the respective timings. In addition, for example, in a case where the plurality of lights at the different wavelengths are respectively modulated at different modulation frequencies and output from the light output unit 110, the detection unit 150 may also obtain information on the different modulation frequencies from the light output unit 110, decompose the detected lights into a plurality of frequency components by Fourier transform or the like, and detect the lights at the respective modulation frequencies to respectively detect the plurality of lights at the different wavelengths.

The correction value calculation unit 160 calculates a correction value $T_c'$ set to reduce an influence of light absorption by the fluid contained in the measurement object 10 based on the first light intensity $I_1$, the second light intensity $I_2$, and the third light intensity $I_3$ by the detection unit 150. At this time, the correction value calculation unit 160 may previously calculate a correction coefficient $\alpha'$ based on the first light intensity $I_1$, the second light intensity $I_2$, and the third light intensity $I_3$ in a plurality of cases where the amount of the fluid contained in the measurement object 10 varies and calculate the correction value $T_c'$ by using the calculated correction coefficient $\alpha'$. Instead of this, the storage unit 170 may also previously store the correction coefficient $\alpha'$, and the correction value calculation unit 160 may also obtain the known correction coefficient $\alpha'$ from the storage unit 170 to calculate the correction value $T_c'$ by using the obtained correction coefficient $\alpha'$. This will be described below. Then, the correction value calculation unit 160 supplies the calculated correction value $T_c'$ to the thickness calculation unit 180. It is noted that the correction value $T_c'$ indicates a parameter used for calculating the physical quantity of the measurement object 10 as will be described below. For example, in a case where the thickness of the measurement object 10 is measured as the physical quantity, the measurement apparatus 100 can calculate the thickness serving as the physical quantity corresponding to the correction value $T_c'$ from calibration curve data.

The storage unit 170 stores the previously known calibration curve data indicating a relationship between the correction value $T_c'$ and the thickness of the measurement object 10. The storage unit 170 may also store the calibration curve data as a table illustrating a plurality of combinations of the correction value $T_c'$ and the thickness of the measurement object 10 or as a relational expression between the correction value $T_c'$ and the thickness of the measurement object 10. Then, the storage unit 170 supplies this calibration curve data to the thickness calculation unit 180. It is noted that, as described above, in a case where the correction value calculation unit 160 uses the predetermined known correction coefficient $\alpha'$, the storage unit 170 may also store this correction coefficient $\alpha'$ and supply the correction coefficient $\alpha'$ to the correction value calculation unit 160 when the correction value calculation unit 160 calculates the correction value $T_a'$.

The thickness calculation unit 180 calculates the thickness of the measurement object 10, in which a measurement error in accordance with the amount of the fluid contained in the measurement object 10 is reduced, based on the first light intensity $I_1$, the second light intensity $I_2$, and the third light intensity $I_3$. At this time, the thickness calculation unit 180 calculates the thickness of the measurement object 10 by using the correction value $T_c'$ calculated by the correction value calculation unit 160 based on the calibration curve data supplied from the storage unit 170. Then, the thickness calculation unit 180 supplies the calculated thickness of the measurement object 10 to the thickness output unit 190.

The thickness output unit 190 outputs the thickness of the measurement object 10 supplied from the thickness calculation unit 180. The thickness output unit 190 may also display the thickness of the measurement object 10 on a display unit, for example, or may also supply the thickness of the measurement object 10 to another apparatus via a wired or wireless network.

Figure 2:
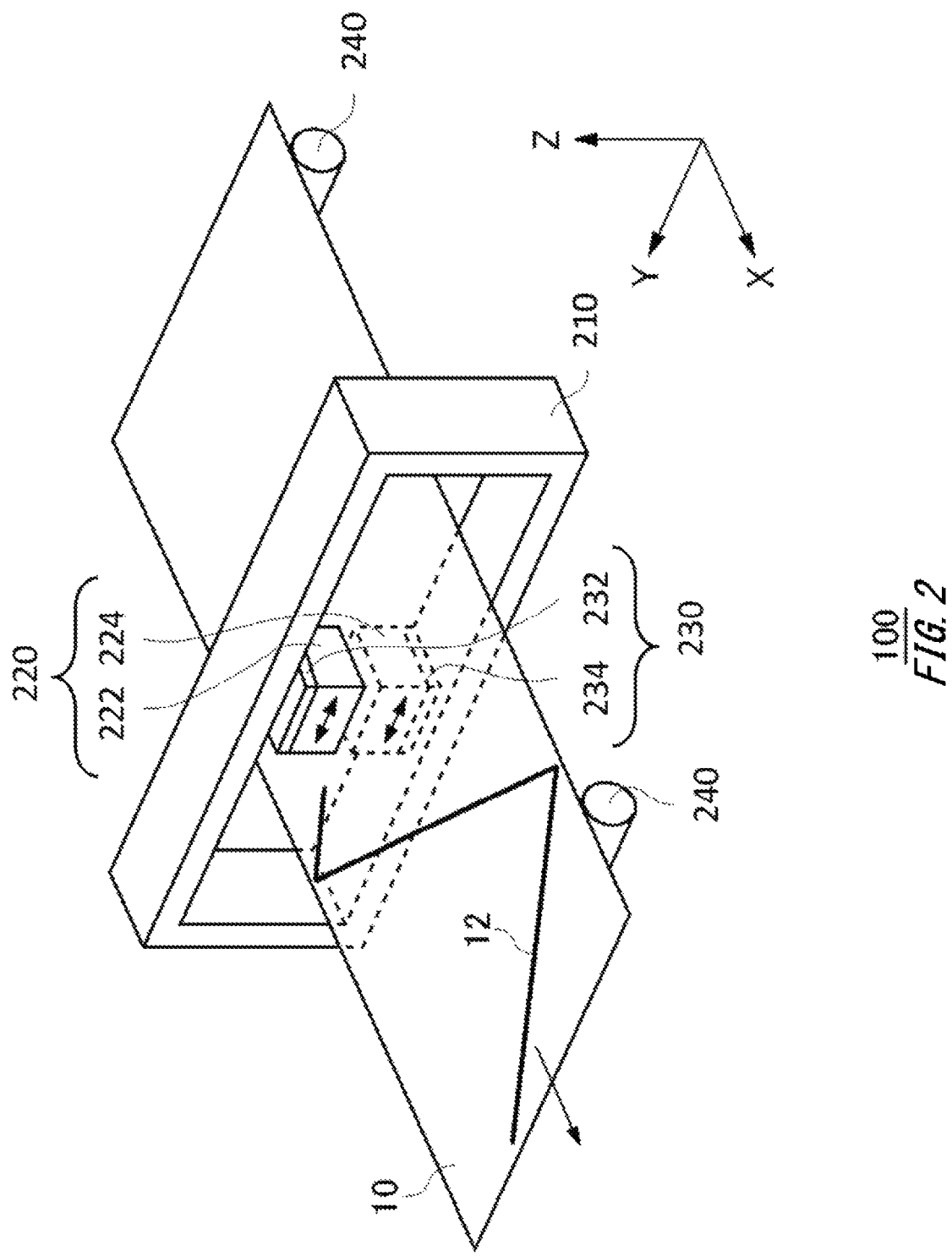
FIG. 2 illustrates a configuration example of the measurement apparatus 100 according to the present embodiment together with the measurement object 10.

FIG. 2 illustrates a configuration example of the measurement apparatus 100 according to the present embodiment together with the measurement object 10. In one example, the measurement apparatus 100 includes a frame 210, a measurement head 220, a head movement unit 230, and an object movement unit 240.

The frame 210 includes an opening section that allows passage of the measurement object 10. In this drawing, an example is illustrated in which a position of the frame 210 is fixed, and the measurement object 10 is conveyed in an X direction. In the frame 210, the measurement head 220 is attached to an inner part of the opening section such that it becomes possible to measure the thickness of the measurement object 10 that passes through the inside of the opening section.

The measurement head 220 optically measures the thickness of the measurement object 10. The measurement head 220 includes a first head 222 and a second head 224. The first head 222 is disposed on a first surface side of the measurement object 10, and the second head 224 is disposed on a second surface side that is an opposite side to a first surface of the measurement object 10. In this drawing, an example is illustrated in which a surface of the measurement object 10 which faces in a +Z direction is set as the first surface, and a surface facing in a −Z direction is set as the second surface.

The first head 222 and the second head 224 are disposed so as to face each other across the measurement object 10. Any one of the light output unit 110 and the detection unit 150 in FIG. 1 is disposed in the first head 222 and the second head 224, and an arrangement is adopted in which, in a case where the measurement object 10 is irradiated with a light from any one of the first head 222 and the second head 224, the other one of the first head 222 and the second head 224 can detect a light that has transmitted through the measurement object 10.

The head movement unit 230 moves the measurement head 220 in a direction substantially perpendicular to a conveyance direction of the measurement object 10. That is, the head movement unit 230 moves the measurement head 220 in a width direction. In other words, the head movement unit 230 fixes the measurement head 220 to the frame 210 so as to be movable in a Y direction. The head movement unit 230 includes a first head movement unit 232 and a second head movement unit 234.

The first head movement unit 232 moves the first head 222 in the width direction on the first surface side of the measurement object 10. The second head movement unit 234 moves the second head 224 in the width direction on the second surface side of the measurement object 10. The first head movement unit 232 and the second head movement unit 234 move the first head 222 and the second head 224 in the width direction while facing each other across the measurement object 10. According to this, while the measurement head 220 is moved by the head movement unit 230, it is possible to continuously execute the measurement of the measurement object 10.

The object movement unit 240 feeds the measurement object 10 in the longitudinal direction. In this drawing, as indicated by an arrow, the conveyance direction of the measurement object 10 by the object movement unit 240 is substantially in parallel with the X direction. The object movement unit 240 includes, for example, a roller or the like on the first surface and/or the second surface of the measurement object 10 and conveys the measurement object 10. The object movement unit 240 may also convey the measurement object 10 by reeling the measurement object 10 by the roller or the like.

The head movement unit 230 and the object movement unit 240 described above may function as movement units that move in synchronization with each other. That is, the movement units move the measurement head 220 in a plane direction relative to the measurement object 10. The movement units reciprocate the measurement head 220 in the width direction of the measurement object 10 while the measurement object 10 is moved in the longitudinal direction, for example. According to this, the movement units may move the measurement head 220 in a zig-zag manner relatively in the plane direction of the measurement object 10. In this drawing, the relative movement direction of the measurement head 220 in the plane direction of the measurement object 10 is represented as a measurement line 12. In this manner, it is desirable that the measurement head 220 can measure the thickness of the measurement object 10 at an arbitrary position.

It is noted that the example in which the measurement apparatus 100 includes the head movement unit 230 and the object movement unit 240 has been illustrated in the above description, but the configuration is not limited to this. For example, the measurement apparatus 100 may simply include any one of the head movement unit 230 and the object movement unit 240. The measurement apparatus 100 may also include the plurality of measurement heads 220. In this case, the measurement apparatus 100 may include the head movement units 230 that respectively move the plurality of measurement heads 220. In addition, the measurement apparatus 100 may also include a frame movement unit that moves the frame 210 instead of the object movement unit 240 that moves the measurement object 10.

In a case where the measurement object 10 is irradiated with the light from the first head 222 in the measurement apparatus 100 described above, for example, the light that has transmitted through the measurement object 10 travels towards the second head 224. The measurement apparatus 100 can measure a light absorbed amount, a light absorption rate, a light absorption coefficient, a light transmittance, and the like of the light of the measurement object 10 based on the above-mentioned transmitted light.

Figure 3:
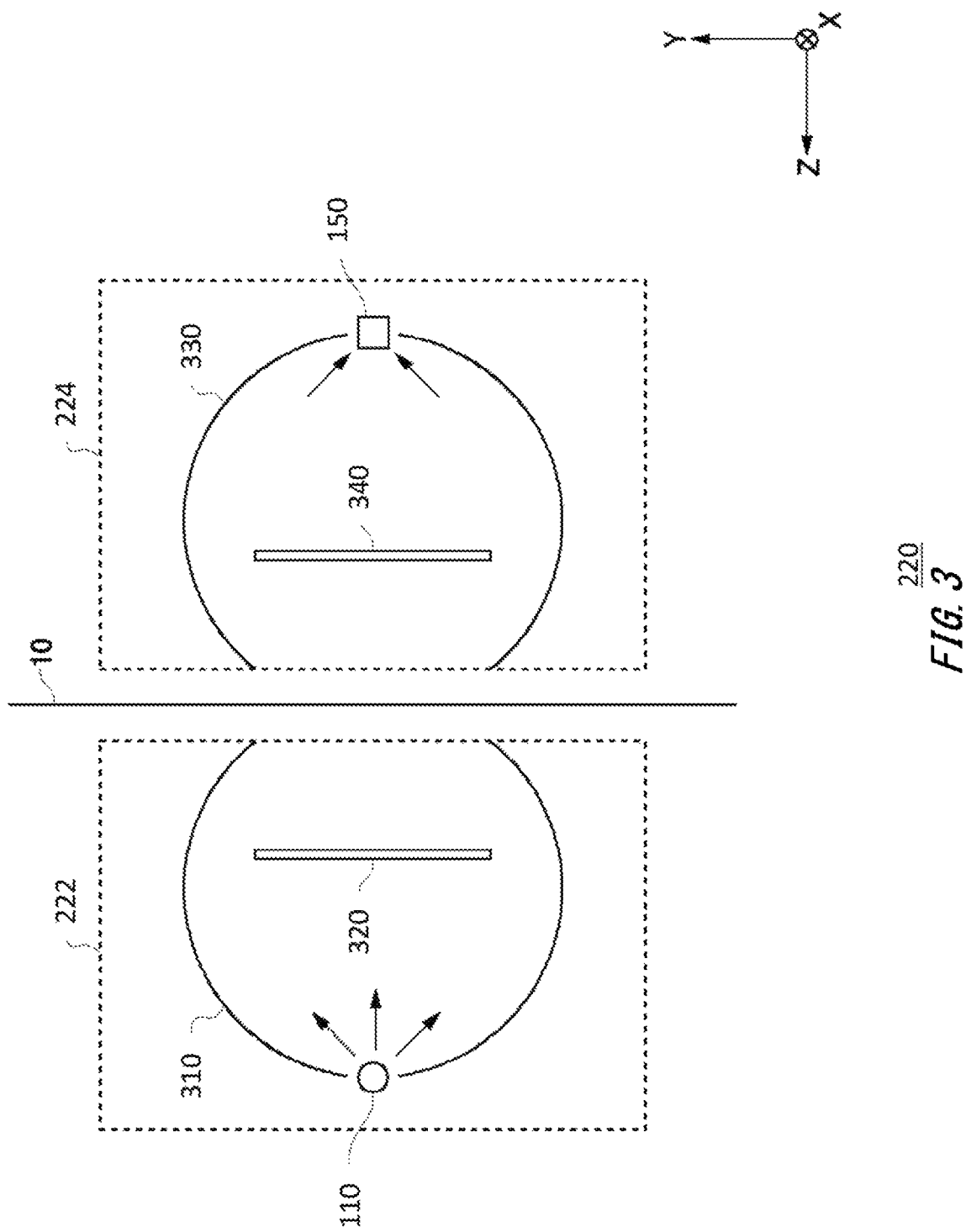
FIG. 3 illustrates a configuration example of a measurement head 220 according to the present embodiment together with the measurement object 10.

FIG. 3 illustrates a configuration example of the measurement head 220 according to the present embodiment together with the measurement object 10. As described in FIG. 2, the measurement head 220 includes the first head 222 and the second head 224. The measurement object 10 is also arranged between the first head 222 and the second head 224. The measurement head 220 includes a first integrating sphere 310, the light output unit 110, a first shielding plate 320, a second integrating sphere 330, the detection unit 150, and a second shielding plate 340.

The first integrating sphere 310 is disposed at a position having a gap with respect to the first surface of the measurement object 10. It is desirable that the first integrating sphere 310 is arranged at a position where no contact is made with the measurement object 10. The first integrating sphere 310 includes a first opening that faces the first surface. The first integrating sphere 310 may have a shape obtained by cutting a part of a globe by a planar surface, and a cut surface may be formed as the first opening. An opening surface of the first opening of the first integrating sphere 310 may be circular. In addition, the first opening of the first integrating sphere 310 may be positioned between a center of the globe of the first integrating sphere 310 and the first surface. That is, a shape of a profile of the first integrating sphere 310 may have a larger surface area and a shape closer to a globular shape as compared with a hemisphere.

An inner wall of the first integrating sphere 310 reflects an input light to be output from the first opening towards the measurement object 10. The inner wall of the first integrating sphere 310 is preferably a high reflectance and also diffusing surface. For example, a surface obtained by plating a roughened surface with gold, a surface obtained by coating a roughened surface with a high reflectance and also highly diffusing material such as barium carbonate, or the like is preferable.

The light output unit 110 emits the light with which the measurement object 10 is to be irradiated to the inside of the first integrating sphere 310. The light output unit 110 may be disposed inside the first integrating sphere 310, or instead of this, may also be disposed outside the first integrating sphere 310. In a case where the light output unit 110 is disposed outside the first integrating sphere 310, the light may be emitted from an opening different from the first opening of the first integrating sphere 310.

The first shielding plate 320 shields part of the light emitted from the light output unit 110. The first shielding plate 320 avoids a situation where the light emitted from the light output unit 110 is not reflected by the inner wall of the first integrating sphere 310 and directly reaches the measurement object 10. That is, the measurement object 10 is irradiated with the light emitted from the light output unit 110 after the light is reflected by the inner wall of the first integrating sphere 310 once or more times. According to this, the measurement object 10 can be irradiated with lights at various incidence angles by the first head 222. An angle of incidence on the measurement object 10 can be set to be larger than 0 degrees, and a measurement accuracy for the measurement object 10 having a thin thickness can be improved by increasing the amount of light absorbed by the measurement object 10. It is noted that the incidence angle in a case where the light is substantially perpendicularly incident on the first surface of the measurement object 10 is set as 0 degrees.

Herein, interference is caused for example by: a constructive action between lights reflected on the front and rear surfaces of the measurement object 10 which is observed if an optical path difference between the lights is $(m+\frac{1}{2})$-times the wavelength of a light used for the measurement; and a destructive action between the lights which is observed if the optical path difference is m times the wavelength of the light used for the measurement (m=0, 1, 2, . . . ). Herein, when the first head 222 emits the lights at various incidence angles, the optical path difference between the lights reflected by the front surface and the rear surface of the measurement object 10 does not become a certain value, and various optical path differences are generated. Since constructive interference and the destructive interference are mixed and averaged by the above-mentioned various optical path differences, an influence of the interference of the entire reflected lights is reduced.

Therefore, even when the measurement object 10 has a birefringence or has the reflected lights on the front surface and/or the rear surface, it is possible to suppress the influence of the interference by using the first head 222. In addition, the first head 222 can efficiently irradiate the measurement object 10 with the light by using the reflected light again due to multiple reflection in the first integrating sphere 310.

The second integrating sphere 330 is disposed at a position having a gap with respect to the second surface on a side opposite to the first surface of the measurement object 10. It is desirable that the second integrating sphere 330 is arranged at a position where no contact is made with the measurement object 10. That is, the first integrating sphere 310 and the second integrating sphere 330 are disposed in positions apart from each other at a predetermined distance, and the measurement object 10 is positioned within a gap between the first integrating sphere 310 and the second integrating sphere 330. Then, the movement unit moves the first integrating sphere 310 and the second integrating sphere 330 described above in the plane direction relative to the measurement object 10.

The second integrating sphere 330 includes a second opening facing the first opening across the measurement object 10. The second integrating sphere 330 may have a shape obtained by cutting a part of a globe by a planar surface, and a cut surface may be formed as the second opening. An opening surface of the second opening of the second integrating sphere 330 may be circular. In addition, the second opening of the second integrating sphere 330 may be positioned between a center of the globe of the second integrating sphere 330 and the second surface. That is, a shape of a profile of the second integrating sphere 330 may have a larger surface area and a shape closer to a globular shape as compared with a hemisphere.

A shape of the second integrating sphere 330 may be a shape similar to the shape of the first integrating sphere 310. The shape of the second integrating sphere 330 may be substantially the same as the shape of the first integrating sphere 310, or instead of this, may also be a different shape. For example, the second opening of the second integrating sphere 330 may be formed to be larger than the first opening of the first integrating sphere 310. An inner wall of the second integrating sphere 330 reflects an input light with which the detection unit 150 is to be irradiated. The inner wall of the second integrating sphere 330 is preferably a high reflectance and also diffusing surface. For example, a surface obtained by plating a roughened surface with gold, a surface obtained by coating a roughened surface with a high reflectance and also highly diffusing material such as barium carbonate, or the like is preferable.

The detection unit 150 detects an intensity of a light inside the second integrating sphere 330. The detection unit 150 may be disposed inside the second integrating sphere 330, or instead of this, may also be disposed outside the second integrating sphere 330. In a case where the detection unit 150 is disposed outside the second integrating sphere 330, the light may be received from an opening different from the second opening of the second integrating sphere 330.

The second shielding plate 340 reflects at least part of the lights reflected by the inside of the second integrating sphere 330 to be leaked to the outside and causes the reflected light to be transmitted to the inside of the second integrating sphere 330 again. The intensity of the light received by the detection unit 150 may fluctuate in accordance with a relative position between the second integrating sphere 330 that reflects the light and the measurement object 10 in some cases. For example, a light to be output to the outside of the second integrating sphere 330 after the light reflected by the inside of the second integrating sphere 330 is not detected by the detection unit 150 fluctuates in accordance with the relative position between the second integrating sphere 330 and the measurement object 10 (surface state or the like of the measurement object 10 such as the gap, inclination, or wrinkling of the measurement object 10). In view of the above, the second shielding plate 340 reduces the fluctuation of the light reception amount of the detection unit 150 by causing the above-mentioned light to be transmitted to the inside of the second integrating sphere 330 again.

The surface of the second shielding plate 340 which faces the measurement object 10 also reflects the light incident from the measurement object 10 on the second integrating sphere 330 to the measurement object 10. The above-mentioned reflected light from the second shielding plate 340 transmits, for example, through the measurement object 10, returns to the first integrating sphere 310 to be reflected by the first integrating sphere 310 and/or the first shielding plate 320, and transmits through the measurement object 10 to be incident on the second integrating sphere 330 again. In this case, since the light incident again on the second integrating sphere 330 transmits through the measurement object 10 three times, it is possible to increase the absorbed amount by the measurement object 10. That is, the light used for the measurement between the first integrating sphere 310 and the second integrating sphere 330 can be reused plural times by the first shielding plate 320 and/or the second shielding plate 340, and the absorbed amount of the light by the measurement object 10 can also be increased in accordance with the number of reuse times. According to this, the measurement apparatus 100 can accurately perform the measurement even when the measurement object 10 is a thin film having approximately several µm.

It is noted that a size and an arrangement of the second shielding plate 340 may be designed so as to correspond to a size and an arrangement of the first shielding plate 320. For example, in a case where a distance between the second shielding plate 340 and the measurement object 10 is substantially the same as a distance between the first shielding plate 320 and the measurement object 10, lengths of the second shielding plate 340 in the X direction and the Y direction may be substantially the same as or shorter than lengths of the first shielding plate 320 in the X direction and the Y direction.

In this manner, since the measurement apparatus 100 according to the present embodiment irradiates the measurement object 10 with the light by using the integrating sphere and detects the transmitted light by using the integrating sphere, the measurement can be accurately performed by simple optical adjustment as compared with a measurement apparatus configured to perform measurement by setting an incidence angle as a Brewster's angle. In addition, even when the relative position between the first head 222 and the second head 224 deviates (alignment deviation), since an influence of a shift of an optical axis or the like is small, the measurement apparatus 100 can be easily applied to the measurement having a real-time property such as online measurement.

In addition, in the above-mentioned online measurement, since the relative position between the measurement head 220 and the measurement object 10 deviates during the measurement, the position of the measurement object 10 may swing to a side of the first integrating sphere 310 or the second integrating sphere 330 (that is, in the Z direction) within the gap between the first integrating sphere 310 and the second integrating sphere 330 in some cases (pass line fluctuation). Even when the above-mentioned deviation of the position of the measurement object 10 occurs, the measurement apparatus 100 can reduce the fluctuation of the light intensity of the light received by the detection unit 150 by using the integrating sphere and output stable measurement results.

It is noted that the light output unit 110 illustrated in FIG. 3 can modulate the light intensities of the measurement light and the reference lights when the rotation control unit 140 in FIG. 1 rotates the filter unit 130. That is, the light output unit 110 can respectively modulate the measurement light and the reference lights having mutually different wavelengths by a modulation frequency and irradiates the inside of the first integrating sphere 310 with a modulated light.

In this case, the detection unit 150 receives the modulated light that has transmitted through the measurement object 10. Then, the correction value calculation unit 160 demodulates a light intensity of the modulated light detected by the detection unit 150 to calculate the respective light intensities of the measurement light and the reference lights. The correction value calculation unit 160 may receive information on the modulation frequency from the light output unit 110 and perform the demodulation. According to this, the measurement apparatus 100 can perform synchronous detection of the measurement light and the reference lights and accurately perform the measurement by reducing an influence of noise or the like.

It is noted that the filter unit 130 illustrated in FIG. 1 includes one each of the first filter 132, the second filter 134, and the third filter 136 as described above. In this case, the number k of rotations of the filter unit 130 per second is equivalent to the modulation frequency for the measurement light and the reference lights.

In view of the above, the filter unit 130 may also include two or more each of the first filters 132, the second filters 134, and the third filters 136. For example, the filter unit 130 may include n pieces of the respective filters. In this case, n pieces of the first filters 132, n pieces of the second filters 134, and n pieces of the third filters 136 are respectively arranged at even intervals with respect to a circumferential direction. The filter unit 130 is divided, for example, into 3·n pieces in the circumferential direction, and the first filters 132, the second filters 134, and the third filters 136 are sequentially arranged.

According to this, the filter unit 130 may also include mutually different numbers of the first filters 132, the second filters 134, and the third filters 136. The filter unit 130 may include, for example, n pieces of the first filters 132, m pieces of the second filters 134, and 1 pieces of the third filters 136. The filter unit 130 may be divided, for example, into three in a radius direction to form three ring-like areas, and then, a first ring area may be divided into n in the circumferential direction, a second ring area may be divided into m in the circumferential direction, and a third ring area may be divided into 1 in the circumferential direction.

According to this, the n pieces of the first filters 132 can be arranged in the first ring area, the m pieces of the second filters 134 can be arranged in the second ring area, and the 1 pieces of the third filters 136 can be arranged in the third ring area at even intervals in the circumferential direction, respectively. According to this, with respect to the number k of rotations of the filter unit 130 per second, the modulation frequency for the measurement light and the two reference lights can be set as respectively different frequencies n·k, m·k, and 1·k. That is, the light output unit 110 can irradiate the inside of the first integrating sphere 310 with a combined light obtained by respectively modulating the measurement light and the reference lights having the mutually different wavelengths by the mutually different modulation frequencies.

The detection unit 150 receives a light obtained by causing the combined light of the measurement light and the reference lights that have been modulated by the mutually different frequencies to be transmitted through the measurement object 10. In this case, the correction value calculation unit 160 demodulates a light intensity of the combined light detected by the detection unit 150 and calculates the respective light intensities of the measurement light and the reference lights.

It is noted that the correction value calculation unit 160 performs the demodulation by using the respectively different frequencies with respect to the measurement light and the two reference lights. For example, the correction value calculation unit 160 demodulates the combined light by the frequency n·k and calculates a light intensity of the measurement light. In addition, the correction value calculation unit 160 demodulates the combined light by the frequency m·k and calculates a light intensity of a first reference light. In addition, the correction value calculation unit 160 demodulates the combined light by the frequency 1·k and calculates a light intensity of a second reference light.

According to this, since the measurement apparatus 100 can calculate the light intensities of the three lights from a detection result of substantially the same combined light, it is possible to improve the real-time property. That is, while the detection unit 150 detects the intensity of the light used for the measurement of the measurement object 10, the movement unit continuously moves the first integrating sphere 310 and the second integrating sphere 330 relative to the measurement object 10, and the measurement can be continuously executed.

In addition to the configuration in which the light intensities of the three lights can be calculated from substantially the same combined light, resistance to noise from the outside is also significantly improved. For example, in a case where the measurement object 10 is a continuously produced resin sheet, the measurement object 10 is continuously conveyed in a high heat state. In this case, a near-infrared light having substantially the same wavelength as the lights used for the measurement such as the measurement light and the reference lights may be generated from the measurement object 10 and superimposed as a noise component in some cases. Such a feeble signal to an extent that the feeble signal is not to be separated from the noise component is not usable for a computation, and the accurate measurement is not attained. For this reason, a light source having a high light emitting intensity to an extent that no influence is received from an environment is required, but in a case where the measurement apparatus 100 is a portable apparatus, for example, there is an upper limit due to a size of the mounted measurement head, a relationship with exhaust heat, and the like.

To sense the above-mentioned feeble signal and accurately compute, an improvement in S/N such as an improvement in a signal component (S) or a reduction in a noise component (N) is demanded in some cases. In view of the above, for a purpose of the above-mentioned improvement in S/N, the measurement apparatus 100 may use a lock-in amplifier that extracts an in-phase component and/or an orthogonal component of a modified signal. For example, the correction value calculation unit 160 includes the lock-in amplifier and demodulates the light intensity of the combined light detected by the detection unit 150 by the lock-in amplifier to calculate the respective light intensities of the measurement light and the reference lights. According to this, the measurement apparatus 100 can accurately compute the feeble signal.

Figure 4:
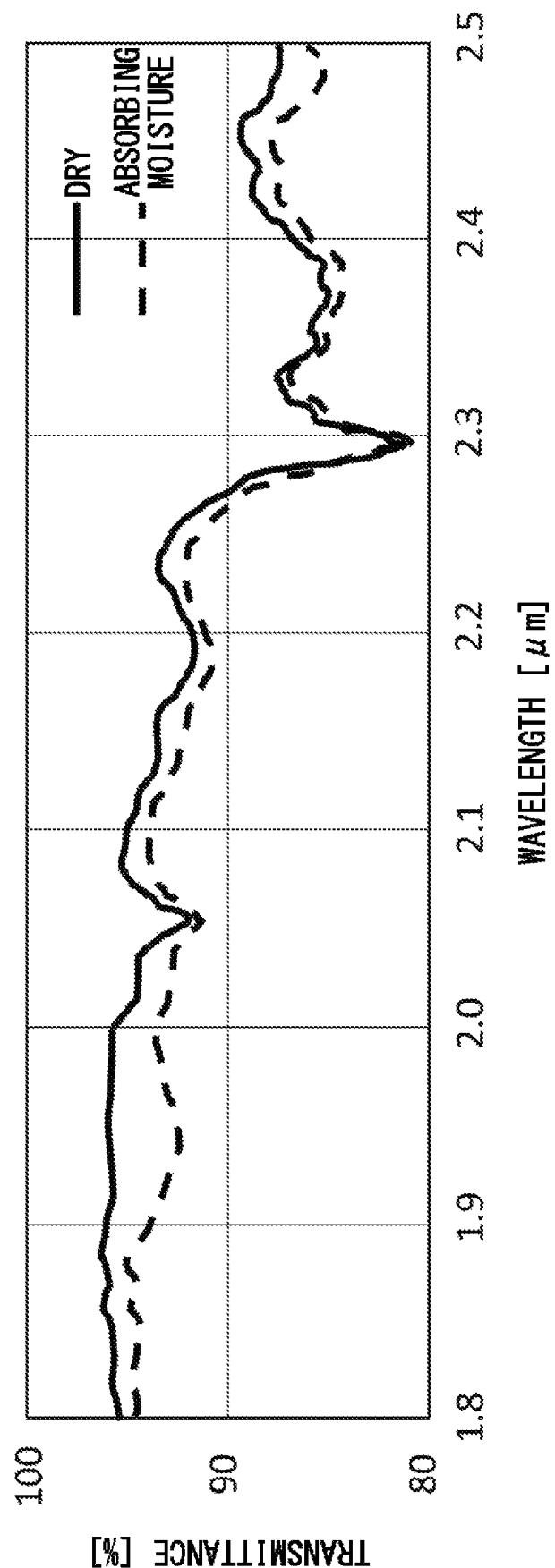
FIG. 4 illustrates transmittance spectra in a case where the measurement object 10 is dried and a case where the measurement object 10 is caused to absorb moisture.

FIG. 4 illustrates transmittance spectra in a case where the measurement object 10 is dried and a case where the measurement object 10 is caused to absorb moisture. This drawing illustrates the respective transmittance spectra when a nylon film is used as the measurement object 10 in a case where the same nylon film is dried and a case where the same nylon film is caused to absorb moisture, in which a vertical axis represents a transmittance [%], and a horizontal axis represents a wavelength [μm]. As illustrated in this drawing, overall, the transmittance is decreased in a case where the nylon film is caused to absorb moisture as compared with a case where the nylon film is dried. That is, this means that the light is absorbed by the moisture contained in the nylon film.

Figure 5:
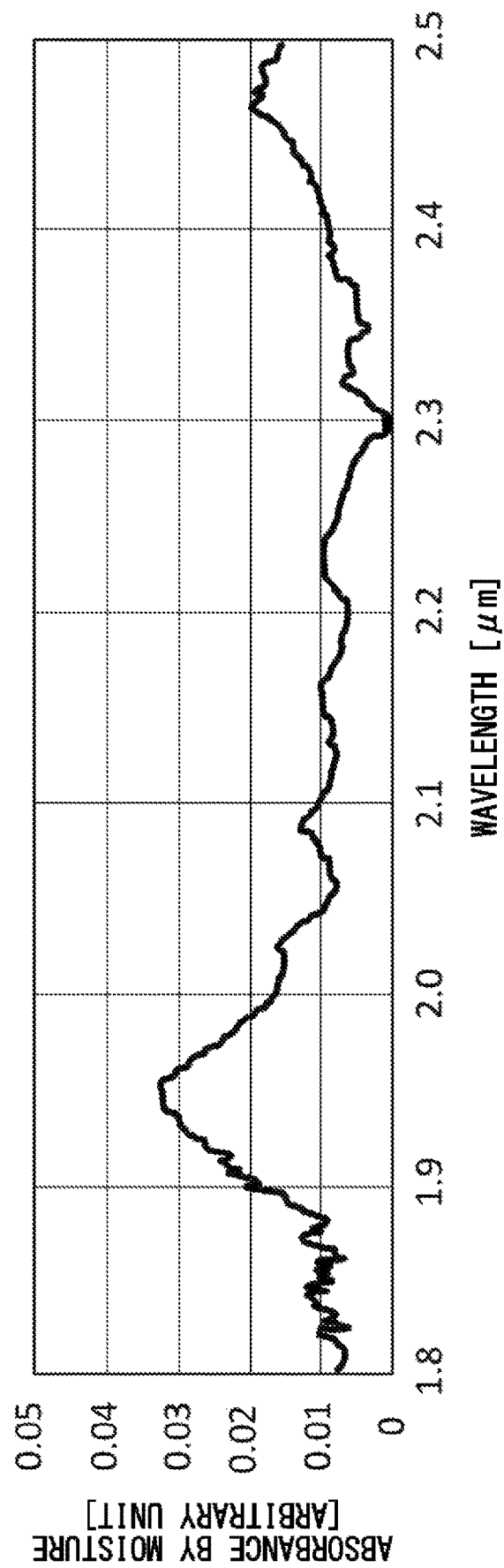
FIG. 5 illustrates a wavelength characteristic of an absorbance by moisture contained in the measurement object 10.

FIG. 5 illustrates a wavelength characteristic of an absorbance by the moisture contained in the measurement object 10. This drawing illustrates the wavelength characteristic of the absorbance by the moisture in a case where the same nylon film as FIG. 4 is used as the measurement object 10, in which a vertical axis represents an absorbance [arbitrary unit] by the moisture contained in the measurement object 10, and a horizontal axis represents a wavelength [μm]. Herein, when the absorbance is to be calculated, the transmittance in a case where the nylon film in FIG. 4 is dried is divided by the transmittance in a case where the nylon film is caused to absorb moisture to calculate a rate of change in the transmittance by the moisture, and a log of the value is taken to calculate the absorbance by the moisture.

As illustrated in this drawing, the absorbance by the moisture is not uniform in the entire wavelength band and has wavelength dependence. This is caused by an absorption spectrum of a light by water molecules contained in the measurement object 10 or the like. The measurement apparatus 100 according to the present embodiment uses a light at a wavelength selected by taking this wavelength dependence of the absorbance by the moisture into account as one of the reference lights for measuring the measurement object 10. In more detail, the measurement apparatus 100 according to the present embodiment proactively uses the wavelength at which the absorbance by the moisture contained in the measurement object 10 is practically high as one of the reference lights to correct an influence of the moisture contained in the measurement object 10, and obtains the stable thickness output.

In one example, in a case where the measurement object 10 is the nylon film, the first wavelength $\lambda_1$ of the first light serving as the measurement light is set as 2.29 μm corresponding to a wavelength at which the rate of absorption of the light by the material of the measurement object 10 is relatively high or preferably the highest in the measurement apparatus 100 according to the present embodiment. In addition, the second wavelength $\lambda_2$ of the second light serving as one of the reference lights is set as 1.94 μm corresponding to a wavelength at which the rate of absorption by the material of the measurement object 10 is lower than the first wavelength $\lambda_1$, and also the rate of absorption by the measurement object 10 containing moisture is relatively high, that is, the absorbance by the moisture is practically high in the measurement apparatus 100. In addition, the third wavelength $\lambda_3$ of the third light serving as the other one of the reference lights is set as 2.23 μm corresponding to a wavelength at which the rate of absorption by the material of the measurement object 10 is lower than the first wavelength $\lambda_1$, and also the rate of absorption by the measurement object 10 containing moisture is lower than the second wavelength $\lambda_2$, that is, the absorbance by the moisture is practically low in the measurement apparatus 100.

Herein, as illustrated in FIG. 5, the absorbance by the moisture at the second wavelength $\lambda_2$ (=1.94 μm) is higher than or equal to 0.03. In addition, the absorbance by the moisture at the third wavelength $\lambda_3$ (=2.23 μm) is approximately 0.01. In this manner, the absorbance by the fluid at the second wavelength $\lambda_2$ is preferably two or more times as high as the absorbance by the fluid at the third wavelength $\lambda_3$. In a case where a difference of the absorbance by the fluid is large and preferably two folds or higher with regard to the wavelengths of the two lights used as the reference lights, since the correction value $T_c'$ at which the influence of the light absorption by the fluid is further reduced can be calculated, it is possible to obtain more stable thickness output in which the influence of the fluid is corrected.

In addition, the first wavelength $\lambda_1$ is 2.29 μm, the second wavelength $\lambda_2$ is 1.94 μm, and the third wavelength $\lambda_3$ is 2.23 μm. In this manner, the third wavelength $\lambda_3$ is preferably closer to the first wavelength $\lambda_1$ than the second wavelength $\lambda_2$. In a case where the third wavelength $\lambda_3$ is closer to the first wavelength $\lambda_1$ than the second wavelength $\lambda_2$ with regard to the wavelengths of the two lights used as the reference lights, a measurement error due to light scattering can be reduced.

Figure 6:
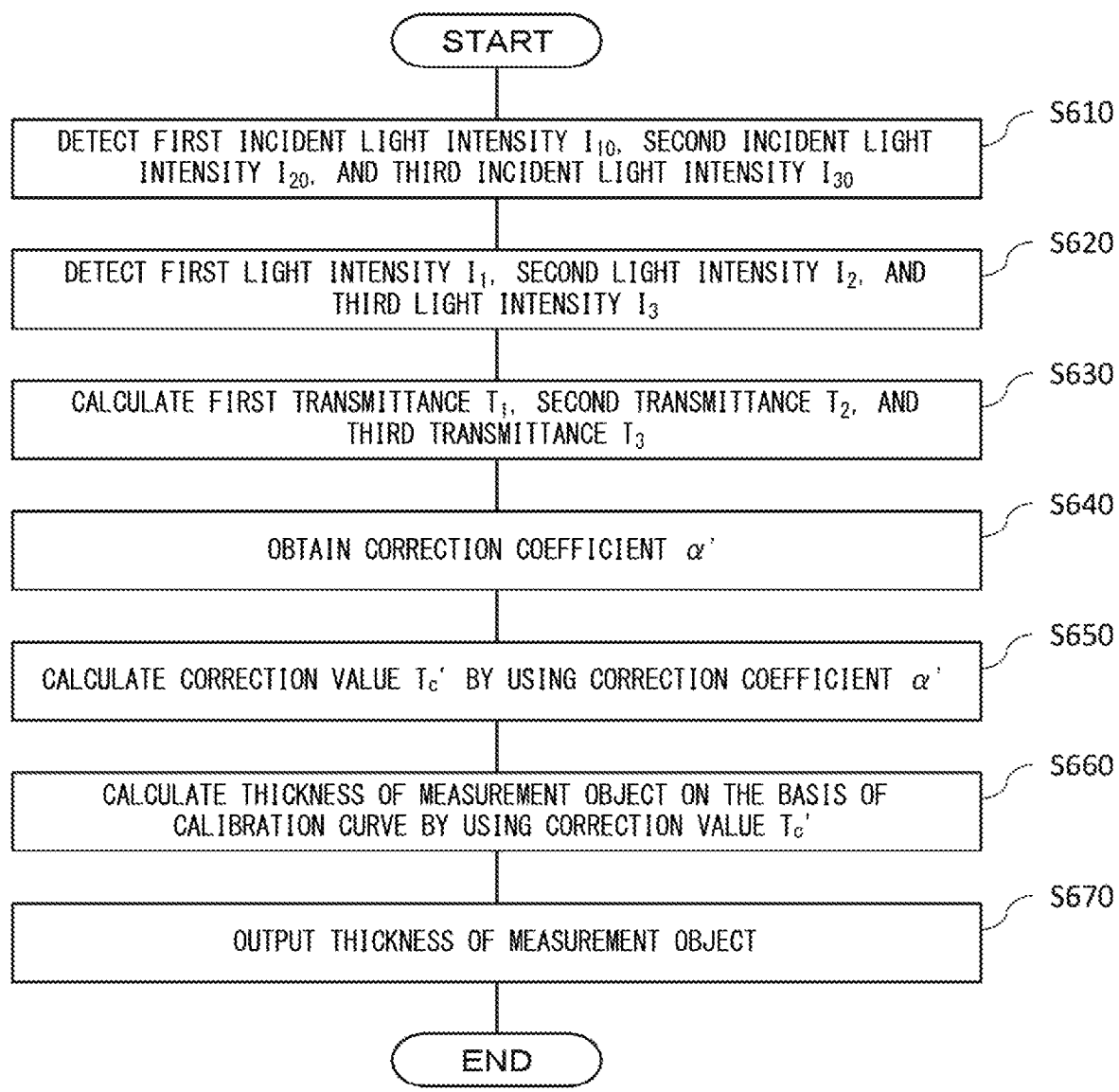
FIG. 6 illustrates a flow for the measurement apparatus 100 according to the present embodiment to calculate a thickness of the measurement object 10.

FIG. 6 illustrates a flow for the measurement apparatus 100 according to the present embodiment to calculate the thickness of the measurement object 10. In step 610, the measurement apparatus 100 detects the first incident light intensity $I_{10}$, the second incident light intensity $I_{20}$, and the third incident light intensity $I_{30}$ in a state in which the measurement object 10 is not set in the measurement position. For example, in a state in which the measurement object 10 does not intervene between the light output unit 110 and the detection unit 150, the light output unit 110 emits the first light, the second light, and the third light at the same intensities as the intensities at the time of the measurement of the measurement object 10, and the detection unit 150 detects the respective light intensities as the first incident light intensity $I_{10}$, the second incident light intensity $I_{20}$, and the third incident light intensity $I_{30}$.

Next, in step 620, the measurement apparatus 100 detects the first light intensity $I_1$, the second light intensity $I_2$, and the third light intensity $I_3$ in a state in which the measurement object 10 is set in the measurement position. For example, the light output unit 110 emits the first light, the second light, and the third light at the same intensities as the intensities in step 610 in a state in which the measurement object 10 intervenes between the light output unit 110 and the detection unit 150, and the detection unit 150 detects the respective light intensities after the transmission through the measurement object 10 as the first light intensity $I_1$, the second light intensity $I_2$, and the third light intensity $I_3$.

Next, in step 630, the correction value calculation unit 160 calculates the first transmittance $T_1$ of the light obtained by causing the first light to be transmitted through the measurement object 10 based on the first light intensity $I_1$, calculates the second transmittance $T_2$ of the light obtained by causing the second light to be transmitted through the measurement object 10 based on the second light intensity $I_2$, and calculates the third transmittance $T_3$ of the light obtained by causing the third light to be transmitted through the measurement object 10 based on the third light intensity $I_3$. For example, the correction value calculation unit 160 calculates the first transmittance $T_1$, the second transmittance $T_2$, and the third transmittance $T_3$ by the following expression based on the first incident light intensity $I_{10}$, the second incident light intensity $I_{20}$, and the third incident light intensity $I_{30}$, detected in step 610 and also the first light intensity $I_1$, the second light intensity $I_2$, and the third light intensity $I_3$ detected in step 620. That is, the correction value calculation unit 160 calculates the transmittances at the respective wavelengths by dividing the intensities of the lights that have transmitted through the measurement object 10 by the intensities of the incident lights at the respective wavelengths.

$$T_1 = \frac{I_1}{I_{10}} \quad \text{[Math. 1]}$$

$$T_2 = \frac{I_2}{I_{20}}$$

$$T_3 = \frac{I_3}{I_{30}}$$

Next, in step 640, the measurement apparatus 100 obtains the correction coefficient $\alpha'$. When the correction coefficient $\alpha'$ is to be obtained, the correction value calculation unit 160 may also previously calculate the correction coefficient $\alpha'$ based on the first light intensity $I_1$, the second light intensity $I_2$, and the third light intensity $I_3$ in a plurality of cases where the amount of the fluid contained in the measurement object 10 varies or may also obtain the known correction coefficient $\alpha'$ from the storage unit 170. In a case where the correction coefficient $\alpha'$ is calculated by the correction value calculation unit 160, for example, the correction value calculation unit 160 calculates the correction coefficient $\alpha'$ based on the first light intensity $I_1$, the second light intensity $I_2$, and the third light intensity $I_3$ in a case where the amount of the fluid contained in the measurement object 10 is changed. In one example, the correction value calculation unit 160 may calculate the correction coefficient $\alpha'$ by using a solver function. It is noted that the solver function generally refers to a function with which it is possible to calculate optimal values of variables in an expression including the plurality of variables to obtain a target value. When the solver function is used, a correlative relationship of the variables is determined while the values of the plurality of variables are changed, and the optimal values can be calculated.

Up to now, a technique for irradiating the measurement object 10 with lights having three wavelengths and calculating a correction transmittance $T_c$ as in the following expression has been proposed as three-wavelength measurement. Herein, in (Math. 2), $\alpha_1$ and $\alpha_2$ (collectively referred to as $\alpha$.) are constants, and a relationship of $\alpha_1 + \alpha_2 = 1$ is satisfied. That is, it has been proposed that a transmittance that may be obtained in a case where the measurement light is not caused to be transmitted through the measurement object 10 is interpolated from the transmittances ($T_2$ and $T_3$) calculated by using the two reference lights, and the transmittance ($T_1$) obtained in a case where the measurement light is caused to be transmitted through the measurement object 10 is divided by the interpolated transmittance ($\alpha_1 T_2 + \alpha_2 T_3$) to calculate the correction transmittance $T_c$.

$$T_c = \frac{T_1}{\alpha_1 T_2 + \alpha_2 T_3} \quad \text{[Math. 2]}$$

The correction value calculation unit 160 calculates the respective correction transmittances $T_c$ in a case where the amount of the fluid contained in the measurement object 10 is changed by (Math. 1) and (Math. 2) based on the first light intensity $I_1$, the second light intensity $I_2$, and the third light intensity in a case where the amount of the fluid contained in the measurement object 10 is changed. Then, the correction value calculation unit 160 obtains a constant $\alpha$ at which changes in the respective correction transmittances $T_c$ in a case where the amount of fluid is changed are minimized by using the solver function. The correction value calculation unit 160 calculates this constant $\alpha$ obtained by using the solver function as the correction coefficient $\alpha'$.

The case has been illustrated as an example where the correction value calculation unit 160 calculates the correction coefficient $\alpha'$ by using the solver function in the above description, but the configuration is not limited to this. First, the correction value calculation unit 160 calculates a primary first transmittance $T_{11}$, a primary second transmittance $T_{21}$, and a primary third transmittance $T_{31}$ in a case where the amount of the fluid contained in the measurement object 10 is an arbitrary amount by (Math. 1). Next, the correction value calculation unit 160 calculates a secondary first transmittance $T_{12}$, a secondary second transmittance $T_{22}$, and a secondary third transmittance $T_{32}$ after the amount of the fluid contained in the measurement object 10 is changed by (Math. 1) again. Then, the correction value calculation unit 160 obtains the constant $\alpha$ by solving the following equation. The correction value calculation unit may also calculate this constant $\alpha$ obtained by solving the equation in (Math. 3) as the correction coefficient $\alpha'$.

$$\frac{T_{11}}{\alpha_1 T_{21} + \alpha_2 T_{31}} = \frac{T_{12}}{\alpha_1 T_{22} + \alpha_2 T_{32}} \quad \text{[Math. 3]}$$

Next, in step 650, the correction value calculation unit 160 calculates the correction value $T_c'$ by using the first transmittance $T_1$, the second transmittance $T_2$, and the third transmittance $T_3$ that have been calculated. In more detail, the correction value calculation unit 160 calculates the correction value $T_c'$ by assigning the correction coefficient $\alpha'$ obtained in step 640 to each of $\alpha_1$, and $\alpha_2$ in (Math. 2).

Then, in step 660, the thickness calculation unit 180 calculates the thickness of the measurement object 10 based on the calibration curve data supplied from the storage unit 170 by using the correction value $T_c'$ calculated by the correction value calculation unit 160 in step 650.

Finally, in step 670, the thickness output unit 190 outputs the thickness of the measurement object 10 calculated in step 660 by using various means.

It is noted that the case has been described where the correction value calculation unit 160 calculates the transmittances based on the light intensities to calculate the correction coefficient $\alpha'$ and the correction value $T_c'$ based on the transmittances in the above description, but the configuration is not limited to this. For example, in a case where an output level of the light emitted from the light source 120 does not have the wavelength dependence or a case where the wavelength dependence is relatively small, the correction value calculation unit 160 may also calculate the correction coefficient α' and the correction value $T_c'$ by directly using the detected light intensities without calculating the transmittances. That is, the correction value calculation unit 160 may also calculate the correction coefficient α' and the correction value $T_c'$ by respectively replacing the transmittances $T_1$, $T_2$, and $T_3$ with the light intensities $I_1$, $I_2$, and $I_3$ in (Math. 2) and (Math. 3). In this case, the measurement apparatus 100 can skip step 610 and step 630 described above.

The case has also been described the two lights are used the reference lights as an example in the above description, but the configuration is not limited to this. The measurement apparatus 100 may also use three or more lights as the reference lights. In a case where three lights are used as the reference lights, for example, the detection unit 150 may detect a fourth light intensity $I_4$ of a light obtaining by causing a fourth light having a fourth wavelength $\lambda_4$ to be transmitted through the measurement object 10, the fourth wavelength having a lower rate of absorption by the material of the measurement object 10 than the first wavelength $\lambda_1$ and having a lower rate of absorption by the measurement object 10 containing the fluid than the second wavelength $\lambda_2$, and also the fourth wavelength $\lambda_4$ being different from the third wavelength $\lambda_3$. Then, the correction value calculation unit 160 may calculate the correction value $T_c'$ at which an influence of the light absorption by the fluid contained in the measurement object 10 and an influence of the wavelength dependence of the light scattering by the material of the measurement object 10 are reduced based on the first light intensity $I_1$, the second light intensity $I_2$, the third light intensity $I_3$, and the fourth light intensity $I_4$ detected by the detection unit 150.

In this case, similarly as in the first to third lights, the correction value calculation unit 160 detects a fourth incident light intensity $L_{40}$ in step 610 and detects the fourth light intensity $I_4$ in step 620. Next, in step 630, the correction value calculation unit 160 detects a fourth transmittance $T_4$ by dividing the fourth light intensity $I_4$ by the fourth incident light intensity $L_{40}$. Then, in step 640 and step 650, the correction value calculation unit 160 can calculate the correction coefficient α' and the correction value $T_c'$ similarly as in the flow in FIG. 6 by using the following expression instead of (Math. 2) even in a case where the three lights are used as the reference lights. It is noted that $\alpha_1$, $\alpha_2$, and $\alpha_3$ (collectively referred to as α.) are constants in (Math. 4), and a relationship of $\alpha_1+\alpha_2+\alpha_3=1$ is satisfied.

$$T_c = \frac{T_1}{\alpha_1 T_2 + \alpha_2 T_3 + \alpha_3 T_4} \quad \text{[Math. 4]}$$

In this manner, in a case where three or more lights are used as the reference lights, since the measurement apparatus 100 can correct not only the wavelength dependence of the absorbance by the fluid contained in the measurement object 10 but also the wavelength dependence of the scattering by the material of the measurement object 10, more stable thickness output can be obtained.

Figure 7:
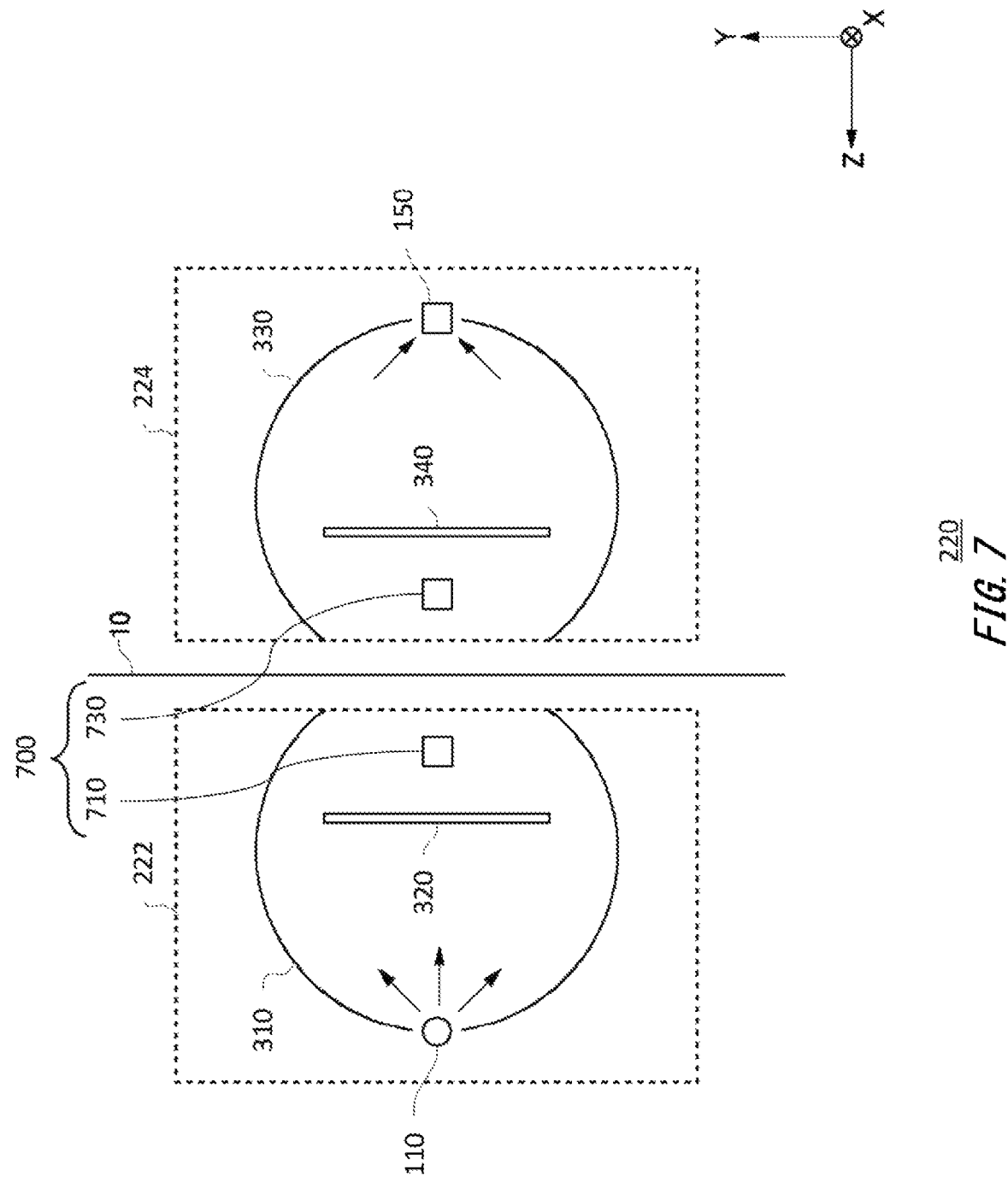
FIG. 7 illustrates a modified example of the measurement head 220 according to the present embodiment.

FIG. 7 illustrates a modified example of the measurement head 220 according to the present embodiment. In the measurement head 220 in the present modified example, substantially the same components as the components of the measurement head 220 according to the present embodiment illustrated in FIG. 3 are assigned with the same reference signs, and descriptions thereof are omitted. The measurement head 220 in the present modified example further includes a gap control unit 700.

The gap control unit 700 maintains a gap between the first opening and the measurement object 10 and a gap between the second opening and the measurement object 10. The gap control unit 700 includes a first control unit 710 on a side of the first head 222 and a second control unit 730 on a side of the second head 224. The gap control unit 700 may maintain the respective gaps by using air pressures. The gap control unit 700 may be disposed inside the integrating sphere, or instead of this, may also be disposed outside the integrating sphere. FIG. 7 illustrates an example in which the first control unit 710 is disposed inside the first integrating sphere 310, and the second control unit 730 is disposed inside the second integrating sphere 330.

In this case, the first control unit 710 may set the air pressure inside the first integrating sphere 310 to be higher than an outside pressure, and the second control unit 730 may set the air pressure inside the second integrating sphere 330 to be higher than the outside pressure. Instead of this, the first control unit 710 may also set the air pressure inside the first integrating sphere 310 to be lower than the outside pressure, and the second control unit 730 may also set the air pressure inside the second integrating sphere 330 to be lower than the outside pressure. The gap control unit 700 sets the insides of the first integrating sphere 310 and the second integrating sphere 330 to have substantially the same air pressure, and presses or attracts the first surface and the second surface of the measurement object 10 by substantially the same force to stabilize the position of the measurement object 10 in the Z direction.

In addition, the gap control unit 700 may include a guide that physically contacts the measurement object 10 or the like in a case where the measurement object 10 is a material that can be contacted by the measurement object 10. The gap control unit 700 may also include a distance sensor that detects a distance with the measurement object 10 for the measurement object 10 to avoid contact with the measurement head 220 due to an abnormality of the movement unit or the like.

That is, the first control unit 710 measures the gap between the first integrating sphere 310 and the measurement object 10. In addition, the second control unit 730 measures the gap between the second integrating sphere 330 and the measurement object 10. In a case where the abnormality is detected, for example, the first control unit 710 and the second control unit 730 notify the movement unit of a notification for stopping movement of the measurement object 10. According to this, while the contact with the measurement object 10 is avoided, the measurement apparatus 100 can detect the abnormality of the movement unit or the like. It is noted that windows may also be respectively attached to an opening section of the first integrating sphere 310 and an opening section of the second integrating sphere 330. According to this, the first integrating sphere 310 and the second integrating sphere 330 can avoid contamination of dust into the insides of the integrating spheres.

Various embodiments of the present invention may be described with reference to flowcharts and block diagrams whose blocks may represent (1) steps of processes in which operations are performed or (2) units of apparatuses responsible for performing operations. Certain steps and units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), a wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 8:
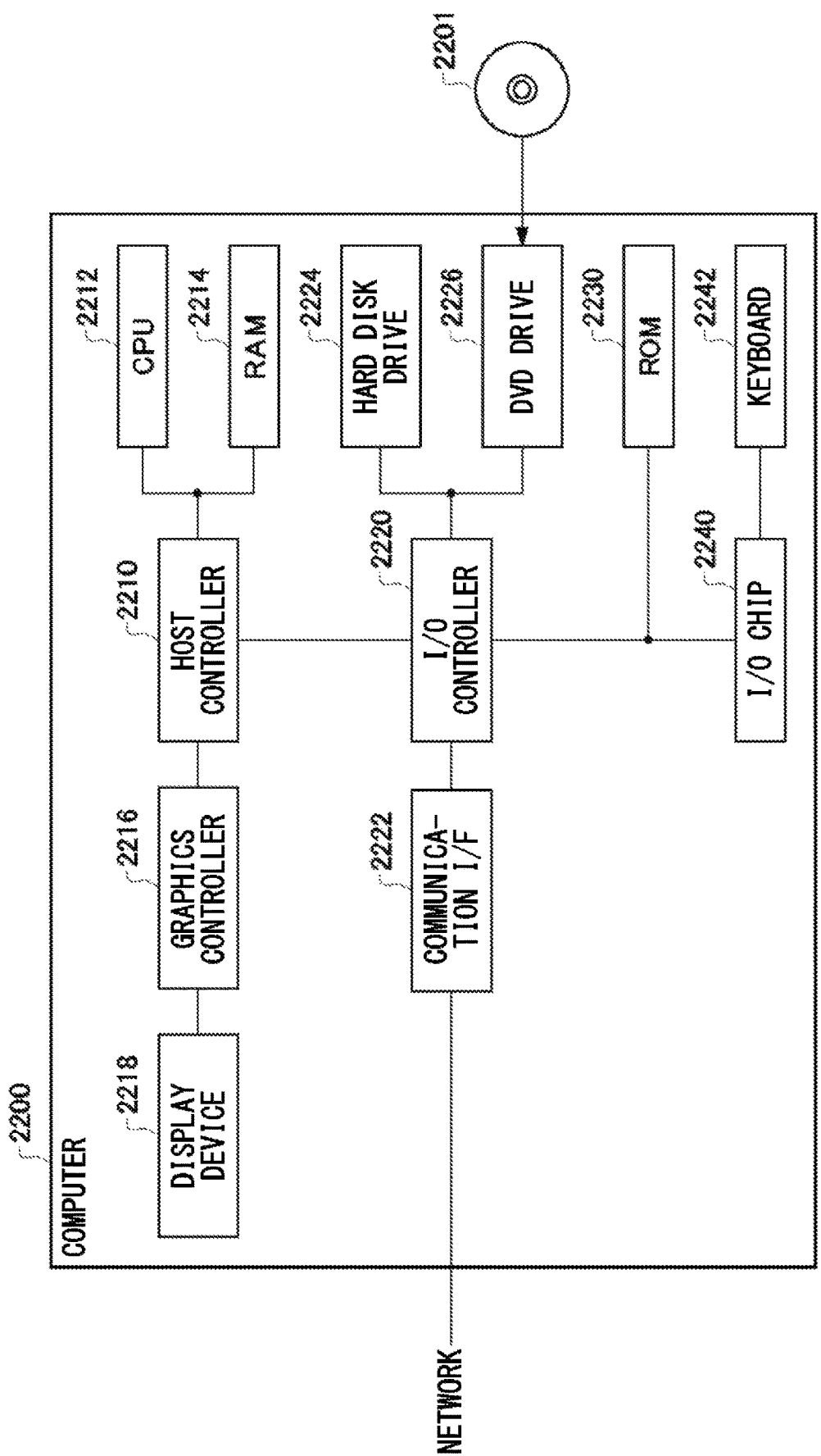
FIG. 8 illustrates an example of a computer 2200 with which all or part of a plurality of modes of the present invention may be embodied.

FIG. 8 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more units thereof, and/or cause the computer 2200 to perform processes of the embodiments of the present invention or steps thereof. Such a program may be executed by a CPU 2212 to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on the computer 2200 or near the computer 2200. In addition, a recording medium such as a hard disk or a RAM provided in a server system connected to a dedicated communication network or the Internet can be used as the computer readable media, thereby providing the program to the computer 2200 via the network.

While the present invention has been described above by way of the embodiments, the technical scope of the present invention is not limited to the range described in the above-mentioned embodiments. It is obvious to the skilled in the art that various alterations and modifications may be made to the above-mentioned embodiments. It is apparent from descriptions in the scope of claims that a mode to which such an alteration or a modification is made may also be included in the technical scope of the present invention.

It should be noted that an execution order for each processing such as the operation, the procedure, the step, and the stage in the apparatus, the system, the program, and the method illustrated in the scope of claims, the specification, and the drawings may be realized in an arbitrary order unless "ahead of", "prior to", or the like is explicitly mentioned particularly and unless the output of the previous processing is used in the subsequent processing. With regard to the operation flow in the scope of claims, the specification, and the drawings, even when the description is provided by using "first,", "next,", or the like for convenience, it does not mean that it is necessary to implement the execution in this order.

REFERENCE SIGNS LIST 10 measurement object
100 measurement apparatus
110 light output unit
120 light source
130 filter unit
132 first filter
134 second filter
136 third filter
140 rotation control unit
150 detection unit
160 correction value calculation unit
170 storage unit
180 thickness calculation unit
190 thickness output unit
210 frame
220 measurement head
222 first head
224 second head
230 head movement unit
232 first head movement unit
234 second head movement unit
240 object movement unit
310 first integrating sphere
320 first shielding plate
330 second integrating sphere
340 second shielding plate
700 gap control unit
710 first control unit
730 second control unit
2200 computer
2201 DVD-ROM
2210 host computer
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. A measurement apparatus that measures a thickness of a sheet-like measurement object, the measurement apparatus comprising:
a light output unit configured to transmit light through the measurement object;
a detection unit configured to detect
a first light intensity of a light obtained by causing a first light having a first wavelength to be transmitted through the measurement object,
a second light intensity of a light obtained by causing a second light having a second wavelength to be transmitted through the measurement object, the second wavelength having a lower rate of absorption by a material of the measurement object than the first wavelength, and
a third light intensity of a light obtained by causing a third light having a third wavelength to be transmitted through the measurement object, the third wavelength having a lower rate of absorption by the material of the measurement object than the first wavelength and having a lower rate of absorption by the measurement object containing a fluid than the second wavelength;
a correction value calculation unit configured to calculate a correction value set to reduce an influence of light absorption by the fluid contained in the measurement object based on the first light intensity, the second light intensity, and the third light intensity detected by the detection unit; and
a thickness calculation unit configured to calculate the thickness of the measurement object by using the first light intensity, the second light intensity, the third light intensity, and the correction value calculated by the correction value calculation unit.

2. The measurement apparatus according to claim 1, wherein the fluid is moisture.

3. The measurement apparatus according to claim 1, wherein the correction value calculation unit calculates a correction coefficient based on the first light intensity, the second light intensity, and the third light intensity in a plurality of cases where an amount of the fluid contained in the measurement object varies, and calculates the correction value by using the calculated correction coefficient.

4. The measurement apparatus according to claim 3, wherein the correction value calculation unit calculates the correction coefficient by using an expression in (Math. 3) and assigns the calculated correction coefficient to an expression in (Math. 2) to calculate the correction value, $$\frac{T_{11}}{\alpha_1 T_{21} + \alpha_2 T_{31}} = \frac{T_{12}}{\alpha_1 T_{22} + \alpha_2 T_{32}} \quad [\text{Math. 3}]$$

(where, in the expression in (Math. 3), a primary first transmittance of the first light, a primary second transmittance of the second light, and a primary third transmittance of the third light before the amount of the fluid contained in the measurement object is changed are respectively $T_{11}$, $T_{21}$, and $T_{31}$, a secondary first transmittance of the first light, a secondary second transmittance of the second light, and a secondary third transmittance of the third light after the amount of the fluid contained in the measurement object is changed are respectively $T_{12}$, $T_{22}$, and $T_{32}$, and $\alpha_1$ and $\alpha_2$ are the correction coefficients that satisfy $\alpha_1+\alpha_2=1$.), and $$T_c = \frac{T_1}{\alpha_1 T_2 + \alpha_2 T_3} \quad [\text{Math. 2}]$$

(where, in the expression in (Math. 2), a first transmittance of the first light, a second transmittance of the second light, and a third transmittance of the third light are respectively $T_1$, $T_2$, and $T_3$, and $T_c$ is the correction value.).

5. The measurement apparatus according to claim 1, further comprising:
a storage unit that previously stores a correction coefficient,
wherein the correction value calculation unit calculates the correction value by using the correction coefficient obtained from the storage unit.

6. The measurement apparatus according to claim 1, wherein the correction value calculation unit calculates a first transmittance of a light obtained by causing the first light to be transmitted through the measurement object based on the first light intensity, calculates a second transmittance of a light obtained by causing the second light to be transmitted through the measurement object based on the second light intensity, calculates a third transmittance of a light obtained by causing the third light to be transmitted through the measurement object based on the third light intensity, and calculates the correction value by using the first transmittance, the second transmittance, and the third transmittance that have been calculated.

7. The measurement apparatus according to claim 1, wherein
the detection unit detects a fourth light intensity of a light obtained by causing a fourth light having a fourth wavelength to be transmitted through the measurement object, the fourth wavelength having a lower rate of absorption by the material of the measurement object than the first wavelength and having a lower rate of absorption by the measurement object containing the fluid than the second wavelength, and also the fourth wavelength being different from the third wavelength, and
the correction value calculation unit calculates the correction value set to reduce the influence of the light absorption by the fluid contained in the measurement object and an influence of wavelength dependence of light scattering by the material of the measurement object based on the first light intensity, the second light intensity, the third light intensity, and the fourth light intensity detected by the detection unit.

8. The measurement apparatus according to claim 1, wherein an absorbance by the fluid at the second wavelength is two or more times as high as an absorbance by the fluid at the third wavelength.

9. The measurement apparatus according to claim 1, further comprising:
a light output unit configured to output the first light, the second light, and the third light.

10. The measurement apparatus according to claim 9, further comprising:
a first integrating sphere that is disposed at a position having a gap with respect to a first surface of the measurement object and includes a first opening that faces the first surface; and
a second integrating sphere that is disposed at a position having a gap with respect to a second surface of the measurement object on a side opposite to the first surface and includes a second opening that faces the first opening across the measurement object, wherein
the light output unit irradiates an inside of the first integrating sphere with a light, and
the detection unit detects an intensity of a light inside the second integrating sphere.

11. A measurement method of measuring a thickness of a sheet-like measurement object, the measurement method comprising:
transmitting light from a light source through the measurement object;
detecting a first light intensity of a light obtained by causing a first light having a first wavelength to be transmitted through the measurement object, a second light intensity of a light obtained by causing a second light having a second wavelength to be transmitted through the measurement object, the second wavelength having a lower rate of absorption by a material of the measurement object than the first wavelength, and a third light intensity of a light obtained by causing a third light having a third wavelength to be transmitted through the measurement object, the third wavelength having a lower rate of absorption by the material of the measurement object than the first wavelength and having a lower rate of absorption by the measurement object containing a fluid than the second wavelength;
calculating a correction value set to reduce an influence of light absorption by the fluid contained in the measurement object based on the first light intensity, the second light intensity, and the third light intensity detected by the detection unit; and
calculating the thickness of the measurement object by using the first light intensity, the second light intensity, and the third light intensity that have been detected, and the correction value that has been calculated.

12. A non-transitory computer-readable medium having recorded thereon a measurement program executed by a computer, the measurement program causing the computer to function as:
a light output unit configured to transmit light through the measurement object;
a detection unit configured to detect a first light intensity of a light obtained by causing a first light having a first wavelength to be transmitted through a measurement object, a second light intensity of a light obtained by causing a second light having a second wavelength to be transmitted through the measurement object, the second wavelength having a lower rate of absorption by a material of the measurement object than the first wavelength, and a third light intensity of a light obtained by causing a third light having a third wavelength to be transmitted through the measurement object, the third wavelength having a lower rate of absorption by the material of the measurement object than the first wavelength and having a lower rate of absorption by the measurement object containing a fluid than the second wavelength;

a correction value calculation unit configured to calculate a correction value set to reduce an influence of light absorption by the fluid contained in the measurement object based on the first light intensity, the second light intensity, and the third light intensity detected by the detection unit; and a thickness calculation unit configured to calculate the thickness of the measurement object by using the first light intensity, the second light intensity, and the third light intensity that have been detected by the detection unit, and the correction value that has been calculated by the correction value calculation unit.

* * * * *